W. W. Calvert.
Combing Mach.
9098 X
Patented Sep. 18, 1835.
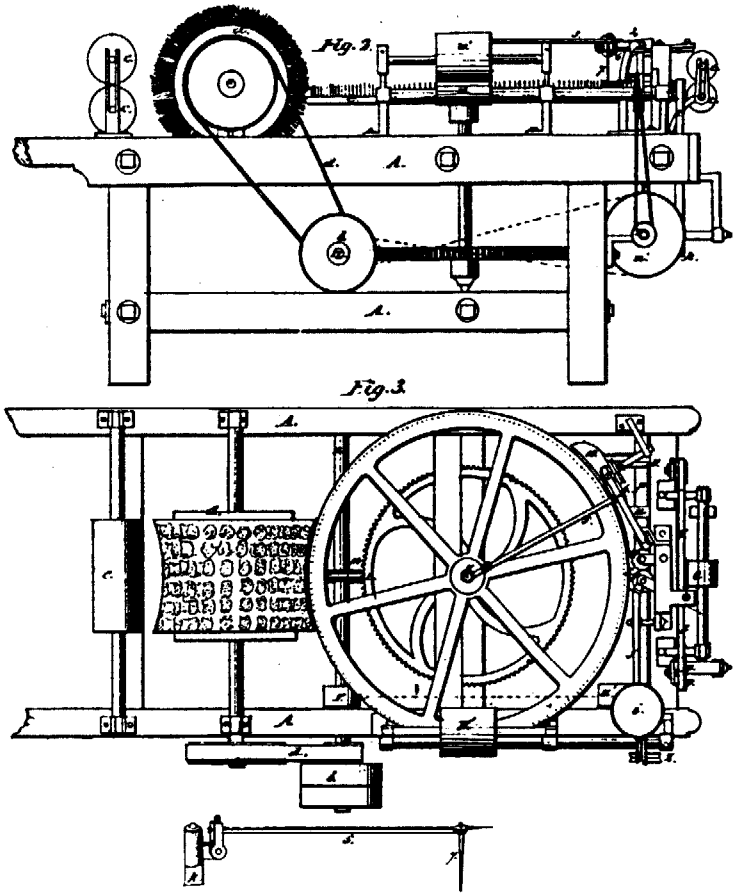
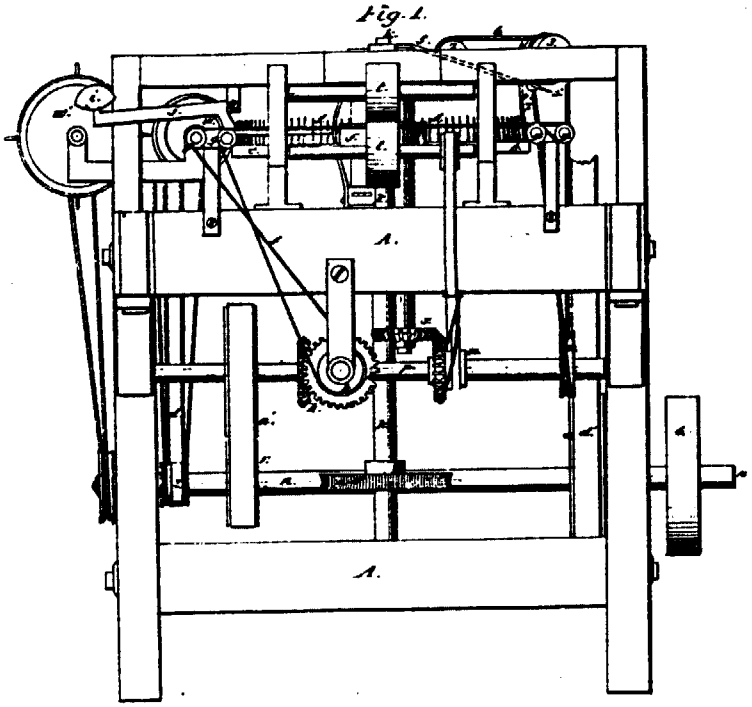

[illegible] Calvert No 52 [illegible]

Sept. 18, 1835 97.

9098X

Letters Patent of.
William W. Calvert. dated the eighteenth day of September 1835.

The schedule referred to in these Letters Patent and making part of the same, containing a description in the words of the said William W. Calvert himself, of his improvement to brush Wool or Flax into teeth set in a cylinder or otherwise.

---

To all to whom these presents shall come.
Be it Known, that I William W. Calvert of Lowell of the County of Middlesex and State of Massachusetts Machinist, have invented a new and useful improvement to brush wool or flax into teeth set in a Cylinder or otherwise as may be convenient and also of combining the parts of the universal swiper called a "wool & flax-brusher for separating long fibres from short fibres," and that the following is a full and exact description of the construction and operation of said machine as is invented or improved by me, reference being had to the drawings herewith, A is the frame, B the main driving pulley, which puts the machine in motion, C,C, are two fixed rollers thro which the wool or flax first enters on the machine D, is a bristle or wire brush about nine inches diameter & six inches long and made curving as shown on the top view, E, is a cylinder about eighteen inches diameter with teeth set round its outer edge, the teeth are about one eighth of an inch in diameter and projects perpendicular up from the cylinder one & three eighths of an inch and set about two eighths of an inch apart, F F, are two small draw rollers, H, H, H, H, are small pulleys for a twisting ting belt to run over and driven by the pulley I. J.J. are
two carrying rollers. K, is an upright shaft on which
the tooth cylinder, E, is fixed, this shaft is made to
revolve slowly by means of, the worm gear, L, which is
driven by a worm being placed on the cross shaft
M, as shown on front view. N is a pulley to drive the
brush D, O is a small pulley to drive the front cross
shaft P. R. R, are two bevel gears to drive the two per-
pendicular draw rollers S.S. - Q is a small shaft attach
ed at one end of the upright shaft K, and works on it
by means of a universal joint the other end is made
fast to a small leather belt which passes over two small
pulleys T.T. and at this end a short prong projects
downward as far as the bottom of the teeth in the cylinder E,
one of the small pulleys T, is driven by the pulleys, U, on
the front shaft P, the small shaft Q, with the prong
on one end and universal joint on the other end
together with the pulley T.T. and the belt ~~that~~ passes
over them I call a universal swipor. V is a small
cylinder covered with cards and driven from the
shaft M. W is a cylinder fitted with teeth so as to repre-
sent a small picker & it is also driven from the shaft
M. The manner of using this, machine is thus — The
wool being carded on a common carding machine
passes thro the feed rollers C.C. and is taken from them
by the, bristles or wire brush D the outward surface of
the brush D. is set ~~[illegible]~~ so as to come slightly, in contact
with the point of the teeth set in cylinder, E, by this
operation the fine short fibres of wool are all collected
into the teeth so as to leave a continual fringe of long
fibres. As the teeth of the cylinder E, revolve slowly
round the long fibres which project from the teeth
are caught by the prong that projects from the universal swiper this prong makes all the fibres which
project out from the teeth in cylinder E, to point directly
to the draw rollers F. F. so that it catches the fibres of wool
by their ends and draws them out from the teeth, when
the above rollers F. F. has drawn the long wool from the
teeth it passes thro the friction belt that runs over
the pulleys H. H, it is then taken by the conveying rollers
f.f, and delivered into drawing cans or boxes in a state of
continued roping ready for other spinning machines
in common use. after the rollers F. F. have taken the
long wool from the teeth in cylinder E. the short wool
being left in the teeth is taken out as it passes round
on the cylinder by the same cylinder V. which is cover-
ed with wool cards it is then taken from cylinder V, by
the small picker W and thrown into boxes, as the empty
teeth on the cylinder, E, are continually presenting them-
selves before the bristle or wire brush D, again they are
loaded and discharged as already described, the
process with flax is the same, it not being previously
carded on wool carding machines, The principle
by which this is distinguished from all other inven
tions to the brushing of wool or flax by a bristle or
wire brush into teeth set in a cylinder or otherwise
as may be convenient and also the combination of
the parts of the universal swiper for which I claim
a Patent.

Witnesses
John L. Sheaf,
Geo. Motley

Wm. W. Calvert

Exd. W.G.

(Drawing)

(1044 words)